(12) United States Patent
Murao et al.

(10) Patent No.: US 9,306,378 B2
(45) Date of Patent: Apr. 5, 2016

(54) METHOD FOR PRODUCING WIRE HARNESS, AND WIRE HARNESS

(71) Applicant: SUMITOMO WIRING SYSTEMS, LTD., Mie (JP)

(72) Inventors: Kazuyoshi Murao, Mie (JP); Takaaki Fukui, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 67 days.

(21) Appl. No.: 14/384,076

(22) PCT Filed: Dec. 27, 2012

(86) PCT No.: PCT/JP2012/083872
§ 371 (c)(1),
(2) Date: Sep. 9, 2014

(87) PCT Pub. No.: WO2013/136632
PCT Pub. Date: Sep. 19, 2013

(65) Prior Publication Data
US 2015/0027778 A1    Jan. 29, 2015

(30) Foreign Application Priority Data

Mar. 15, 2012    (JP) .................................. 2012-058354

(51) Int. Cl.
*H02G 3/04*    (2006.01)
*H01B 13/06*    (2006.01)
*B60R 16/02*    (2006.01)
(Continued)

(52) U.S. Cl.
CPC .......... *H02G 3/0418* (2013.01); *B60R 16/0215* (2013.01); *H01B 19/00* (2013.01); *H02G 3/0481* (2013.01); *H02G 3/26* (2013.01); *H02G 3/30* (2013.01)

(58) Field of Classification Search
CPC .. H02G 3/0418; H01B 19/00; B60R 16/0207; B60R 16/0215
USPC ........................................... 174/72 A; 156/54
See application file for complete search history.

(56) References Cited

U.S. PATENT DOCUMENTS 5,598,627 A * 2/1997 Saka ...................... H01R 12/62
174/72 A
5,895,889 A * 4/1999 Uchida ............... B60R 16/0207
174/72 A
(Continued)

FOREIGN PATENT DOCUMENTS

JP    1-210483    8/1989
JP    2011-138641    7/2011
(Continued)

OTHER PUBLICATIONS

Search report from PCT/JP2012/083872, mail date is Feb. 19, 2013.

*Primary Examiner* — Sherman Ng
(74) *Attorney, Agent, or Firm* — Greenblum & Bernstein, P.L.C.

(57) ABSTRACT

A method for producing a wire harness includes hot pressing a first portion including an edge portion of a nonwoven material, and curing the first portion of the nonwoven material, and thereafter partially overlapping the first portion and a second portion that is softer than the first portion and is the portion of the nonwoven material other than the first portion, so that a wire bundle is covered by the first portion and the second portion.

8 Claims, 7 Drawing Sheets

(51) Int. Cl.
*H01B 19/00* (2006.01)
*H02G 3/30* (2006.01)
*H02G 3/00* (2006.01)

(56) References Cited

U.S. PATENT DOCUMENTS

2005/0092512 A1* 5/2005 Kogure ............... H02G 11/00 174/72 A
2012/0055605 A1* 3/2012 Murata ............ H01B 13/01254 156/51
2012/0309228 A1 12/2012 Masuda et al.
2012/0325519 A1 12/2012 Igarashi et al.
2013/0098660 A1 4/2013 Igarashi et al.

FOREIGN PATENT DOCUMENTS

| | | |
|---|---|---|
| JP | 2011-223743 | 11/2011 |
| JP | 2011-233453 | 11/2011 |
| JP | 2012-39782 | 2/2012 |
| WO | 2011/125247 | 10/2011 |
| WO | 2011/135741 | 11/2011 |
| WO | 2012/020596 | 2/2012 |

* cited by examiner

METHOD FOR PRODUCING WIRE HARNESS, AND WIRE HARNESS

TECHNICAL FIELD

The present invention relates to a wire harness.

BACKGROUND ART

Heretofore, various techniques associated with wire harnesses have been proposed. For example, Patent Document 1 discloses a wire harness in which a wire bundle is covered by a cover member. The cover member according to Patent Document 1 is produced by hot pressing a nonwoven material. Patent Document 2 also discloses a technique associated with an urethane-based adhesive tape.

CITATION LIST

Patent Documents

Patent Document 1: JP 2011-223743 A
Patent Document 2: JP H1(1989)-210483 A

SUMMARY OF INVENTION

Technical Problem

In the technique disclosed in Patent Document 1, the cover member composed of the hot-pressed nonwoven material is comparatively hard, and therefore abnormal noises tend to be generated when an interfering material in the surroundings of the wire harness comes into contact with the cover member. On the other hand, it is possible to restrict the routing of the wire bundle by covering the wire bundle using a cover member that is comparatively hard.

In a wire harness, in which the urethane-based adhesive tape disclosed in Patent Document 2, which is comparatively soft, is wound around the wire bundle, instead of covering the wire bundle using the cover member disclosed in Patent Document 1, generation of abnormal noises is suppressed, but it is more difficult to restrict the routing of the wire bundle.

The present invention is accomplished from such a viewpoint, and aims to provide a technique which makes it possible to restrict the routing of a wire bundle, while suppressing generation of abnormal noises in wire harnesses.

Solution to Problem

A method for producing a wire harness according to a first aspect includes: (a) a step of hot pressing a first portion including an edge portion of a nonwoven material and curing the first portion of the nonwoven material; and (b) a step of partially overlapping, after the step (a), the first portion with a second portion that is softer than the first portion and is a portion of the nonwoven material other than the first portion so that a wire bundle is covered by the first portion and the second portion.

A method for producing a wire harness according to a second aspect is the method for producing a wire harness according to the first aspect, wherein in the step (a), the first portion is hot pressed so that the first portion is bent, and the step (b) includes: (b-1) a step of disposing the wire bundle on a concave surface of the first portion; and (b-2) a step of partially overlapping, after the step (b-1), the first portion and the second portion with each other so that the wire bundle on the first portion is covered by the second portion.

A method for producing a wire harness according to a third aspect is the method for producing a wire harness according to the first aspect, the method further including: (c) a step of attaching, after the step (b), a fixing member for fixing the wire harness to an attachment object to the nonwoven material covering the wire bundle, wherein in the step (c), the fixing member is attached to the nonwoven material so that a fixed part of the fixing member which is fixed to the attachment object is located on the first portion.

A method for producing a wire harness according to a fourth aspect is the method for producing a wire harness according to the first aspect, the method further including: (c) a step of forming, before the step (b), a slit in the second portion, wherein in the step (b), the first portion and the second portion are partially overlapped with each other so that, at a branched portion of the wire bundle where a branch line is branched from a main line, the branch line is exposed through the slit of the second portion, and the main line is covered by the first portion and the second portion.

A wire harness according to a fifth aspect includes: a wire bundle; and a cover member which is composed of a hot-pressed nonwoven material and covers the wire bundle, wherein the cover member has: a first portion that is a portion of the nonwoven material including an edge portion of the nonwoven material and that is hot pressed and cured; and a second portion that is softer than the first portion and is the portion of the nonwoven material other than the first portion, and in the cover member, the first portion and the second portion are partially overlapped with each other so that the wire bundle is covered by the first portion and the second portion.

A wire harness according to a sixth aspect is the wire harness according to the fifth aspect, wherein the first portion is bent so as to be concave on the wire bundle side.

A wire harness according to a seventh aspect is the wire harness according to the fifth aspect, the wire harness further including: a fixing member which is attached to the cover member and by which the wire harness is fixed to an attachment object, wherein the fixing member has a fixed part, which is fixed to the attachment object, located on the first portion.

A wire harness according to an eighth aspect is the wire harness according to the fifth aspect, the wire harness further including a slit provided in the second portion, wherein the first portion and the second portion are partially overlapped with each other so that, at a branched portion of the wire bundle where a branch line is branched from a main line, the branch line is exposed through the slit of the second portion, and the main line is covered by the first portion and the second portion.

Advantageous Effects of Invention

According to the first to eighth aspects, the wire bundle is covered by a member having a first portion that is comparatively hard and a second portion that is comparatively soft, and therefore it is possible to restrict the routing of the wire bundle by the first portion that is comparatively hard, while suppressing generation of abnormal noises by the second portion that is comparatively soft.

Further, since the first portion that is comparatively hard and the second portion that is comparatively soft are partially overlapped with each other so as to cover the wire bundle, it is possible to cover a plurality of types of wire bundles having a different diameter using the same member by adjusting their overlapping margin.

In particular, according to the second and sixth aspects, the first portion and the second portion are partially overlapped with each other in the state where the wire bundle is disposed on the first portion that is bent, thereby making the wire bundle difficult to move when the wire bundle is covered by the first portion and the second portion. Accordingly, it is made easy to cover the wire bundle by the first portion and the second portion. As a result, the workability is improved.

In particular, according to the third and seventh aspects, the fixing member by which the wire harness is fixed to an attachment object has a fixed part, which is fixed to an attachment object, located on the first portion, and therefore it is possible to fix the wire harness to the attachment object so that the second portion that is comparatively soft is oriented toward an interfering material in the surroundings of the wire harness. Accordingly, it is possible to suppress generation of abnormal noises.

In particular, according to the fourth and eighth aspects, a slit is provided in the second portion that is comparatively soft, which makes it possible to easily attach a member covering the wire bundle to a branched portion of the wire bundle.

These and other objects, features, aspects, and advantages of the present invention will become apparent from the following detailed description and attached drawings.

DESCRIPTION OF EMBODIMENTS

Figure 1:
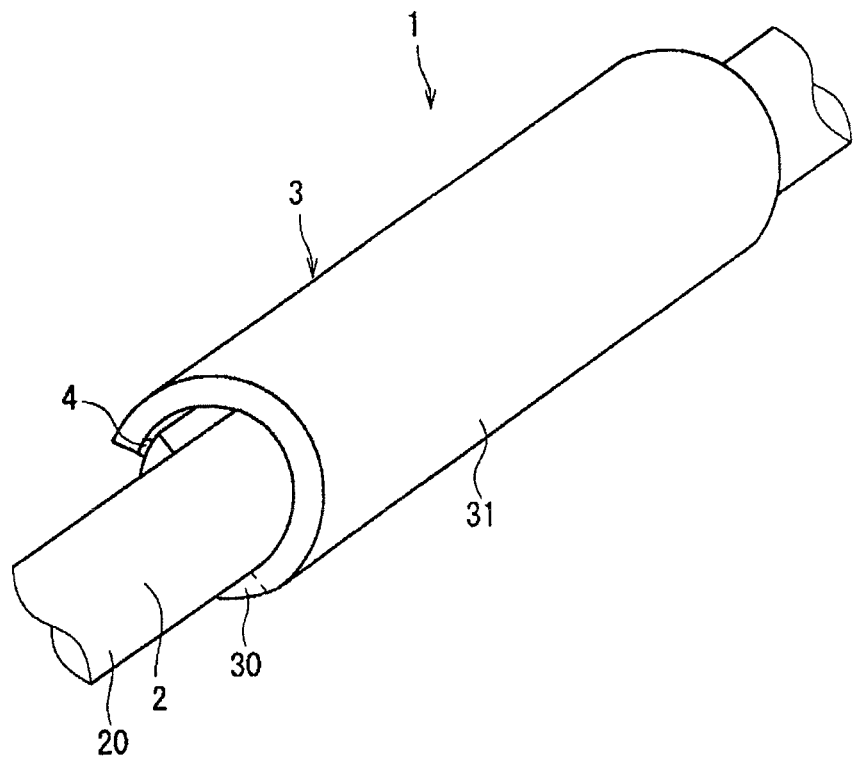
FIG. 1 is a perspective view showing a wire harness.
Figure 2:
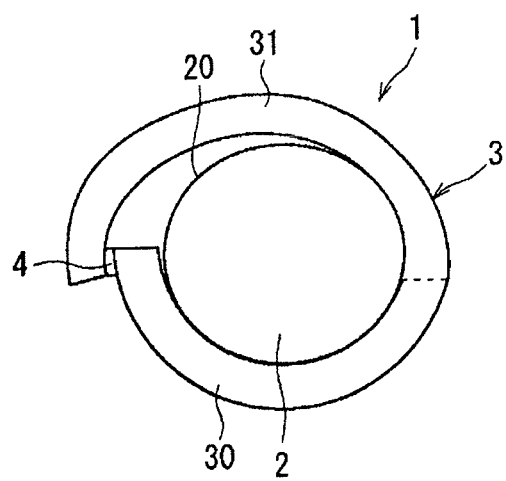
FIG. 2 is a side view showing the wire harness.

FIG. 1 is a perspective view showing a wire harness 1 according to an embodiment. FIG. 2 is a side view showing the wire harness 1 when the wire harness 1 is viewed from a direction in which the wire harness 1 extends. The wire harness 1 according to this embodiment is arranged, for example, in a vehicle such as an automobile. As shown in FIGS. 1 and 2, the wire harness 1 includes a wire bundle 2 formed by bundling a plurality of electric wires, and a cover member 3 covering the wire bundle 2.

The cover member 3 has the function to restrict the routing of the wire bundle 2 when the wire harness 1 is arranged in a vehicle or the like, and the function to protect the wire bundle 2 from interfering materials in the surroundings of the wire harness 1. The cover member 3 is formed of a hot-pressed nonwoven material (for example, a nonwoven fabric). Here, "hot pressing" is processing for molding a nonwoven material by sandwiching the nonwoven material between dies and applying a pressure to the dies under heating. As such a nonwoven material, a nonwoven material that is capable of being cured by undergoing a heating process can be used. Examples of the nonwoven material that can be used include a nonwoven material including base fibers and an adhesive resin (which is referred to also as "binder") that is entangled with these fibers. The adhesive resin is a resin having a melting point (for example, 110° C. to 115° C.) that is lower than the melting point of the base fibers. When the nonwoven material is heated to a processing temperature that is lower than the melting point of the base fibers and higher than the melting point of the adhesive resin, the adhesive resin is melted so as to penetrate between the base fibers. Thereafter, when the temperature of the nonwoven material becomes lower than the melting point of the adhesive resin, the adhesive resin is solidified while bonding the base fibers to each other. This makes the nonwoven material harder than before heating, and allows it to maintain its shape into which it has been molded at the time of the heating.

As the base fibers, various fibers can be used in addition to resin fibers as long as they are fibers capable of maintaining their fibrous state at the melting point of the adhesive resin. Further, thermoplastic resin fibers having a melting point that is lower than the melting point of the base fibers can be used as the adhesive resin. The adhesive resin may be in the form of particles or fibers. Alternatively, it is also possible to fabricate binder fibers by forming an adhesive resin layer around the outer circumference of a core fiber, so that the binder fibers are entangled with the base fibers. As such a core fiber in this case, the same material as for the aforementioned base fibers can be used.

As a combination of the base fibers and the adhesive resin, an example in which PET (polyethylene terephthalate) resin fibers are used as the base fibers, and a copolymer resin of PET and PEI (polyethylene isophthalate) is used as the adhesive resin can be mentioned. In this case, the melting point of the base fibers is about 250° C., and the melting point of the adhesive resin is 110° C. to 150° C. Therefore, when the nonwoven material is heated to a temperature of 110° C. to 250° C., the adhesive resin is melted and penetrates between the base fibers that are not melted and keeping their fibrous state. Then, when the temperature of the nonwoven material becomes lower than the melting point of the adhesive resin, the adhesive resin is solidified while bonding the base fibers to each other, and the nonwoven material is cured to maintain its shape into which it has been molded at the time of the heating.

The cover member 3 has a first portion 30 that is a hot pressed and cured portion of the nonwoven material of the cover member 3, including an edge portion of the nonwoven material and is, and a second portion 31 that is softer than the first portion 30 and is the portion of the nonwoven material other than the first portion 30. The first portion 30 that is comparatively hard is bent so as to be concave on the wire bundle 2 side. The dashed lines shown in FIGS. 1 and 2 indicate a boundary between the first portion 30 and the second portion 31.

In the cover member 3, the first portion 30 and the second portion 31 are partially overlapped with each other so that an outer circumferential surface 20 of the wire bundle 2 is covered by the first portion 30 and the second portion 31. In the example shown in FIGS. 1 and 2, the first portion 30 covers substantially half of the outer circumferential surface of the portion of the wire bundle 2 that is covered by the cover member 3, and the second portion 31 covers the remaining substantially half of the outer circumferential surface thereof.

One edge portion of the first portion 30 in the circumferential direction of the wire bundle 2 and one edge portion of the second portion 31 in the circumferential direction of the wire bundle 2 are overlapped with each other, and those edge portions are adhered to each other, for example, by a double-sided adhesive tape 4 in the overlapped portion. Hereinafter, the first portion 30 that is comparatively hard is referred to as "hard portion 30", and the second portion 31 that is comparatively soft is referred to as "soft portion 31".

Figure 3:
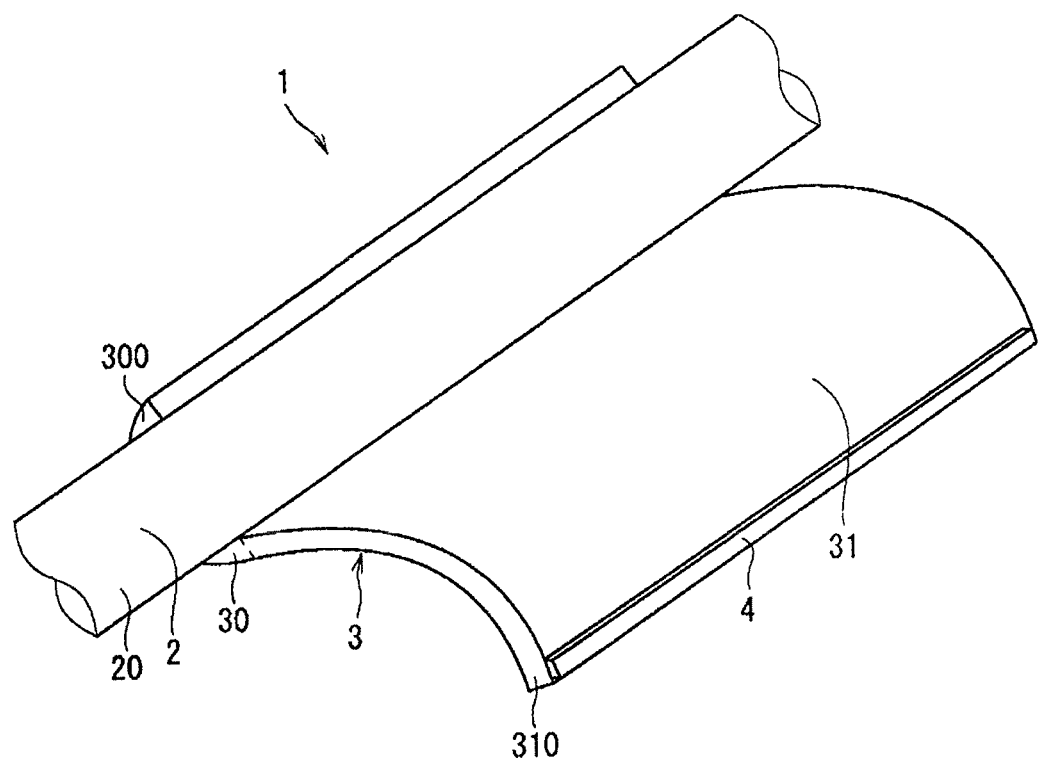
FIG. 3 is a perspective view showing the wire harness before a wire bundle is covered by a cover member.
Figure 4:
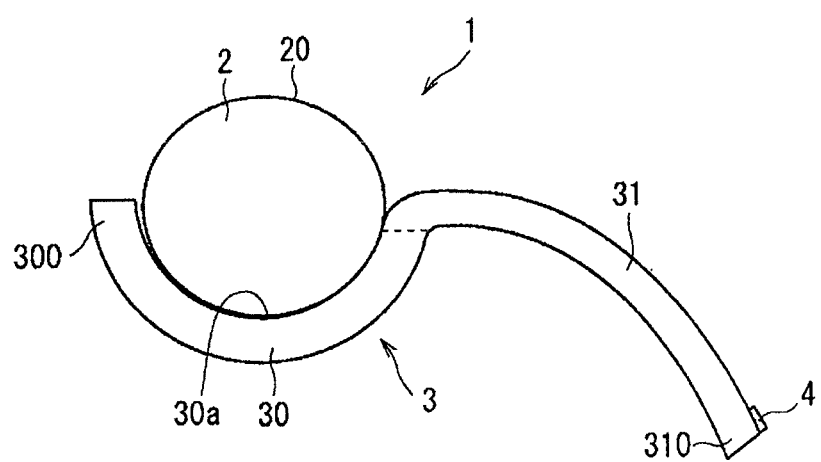
FIG. 4 is a side view showing the wire harness before the wire bundle is covered by the cover member.
Figure 5:
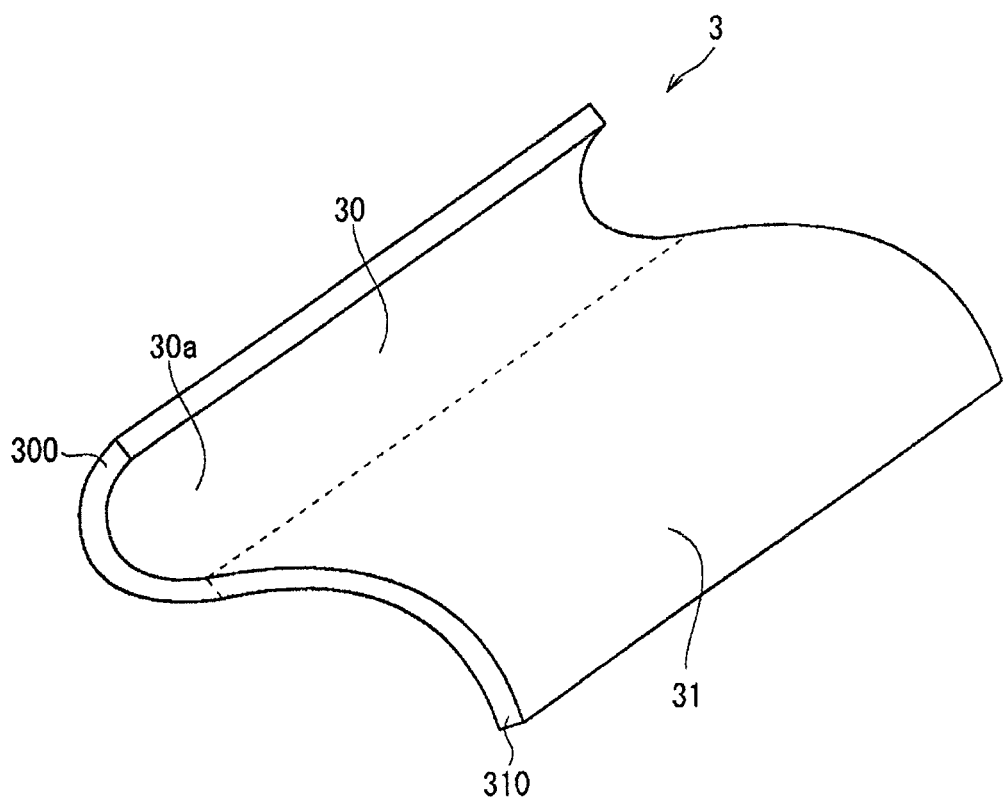
FIG. 5 is a perspective view showing the cover member.

FIG. 3 is a perspective view showing the wire harness 1 before the hard portion 30 and the soft portion 31 are partially overlapped with each other. FIG. 4 is a side view showing the wire harness 1 when the wire harness 1 shown in FIG. 3 is viewed from a direction in which the wire harness 1 extends. FIG. 5 is a perspective view showing the cover member 3 before it covers the wire bundle 2. The dashed lines shown in FIGS. 3 to 5 indicate the boundary between the hard portion 30 and the soft portion 31.

The hard portion 30 formed by partially hot pressing a nonwoven material is molded so as to be bent according to the outer circumferential surface 20 of the wire bundle 2. On the other hand, the soft portion 31 is a portion of the nonwoven material that is not hot pressed, and is soft and in the form of a sheet. The soft portion 31 is continuous with one edge in the bending direction of the hard portion 30.

When the wire bundle 2 is covered by the cover member 3, the wire bundle 2 is disposed on a concave surface 30*a* of the hard portion 30, as shown in FIGS. 3 and 4. Thereafter, an edge portion 310 of the soft portion 31 on the opposite side of the edge portion on the hard portion 30 side is overlapped with an edge portion 300 of the hard portion 30 on the opposite side of the edge portion on the soft portion 31 side in such a manner that the wire bundle 2 on the hard portion 30 is covered by the soft portion 31. The double-sided adhesive tape 4 is applied to the surface of the edge portion 310 of the soft portion 31, so that the double-sided adhesive tape 4 is attached to the edge portion 300 of the hard portion 30 when the edge portion 310 is overlapped with the edge portion 300 of the hard portion 30. Thus, the edge portion 310 of the soft portion 31 and the edge portion 300 of the hard portion 30 are bonded together by the double-sided adhesive tape 4.

Figure 6:
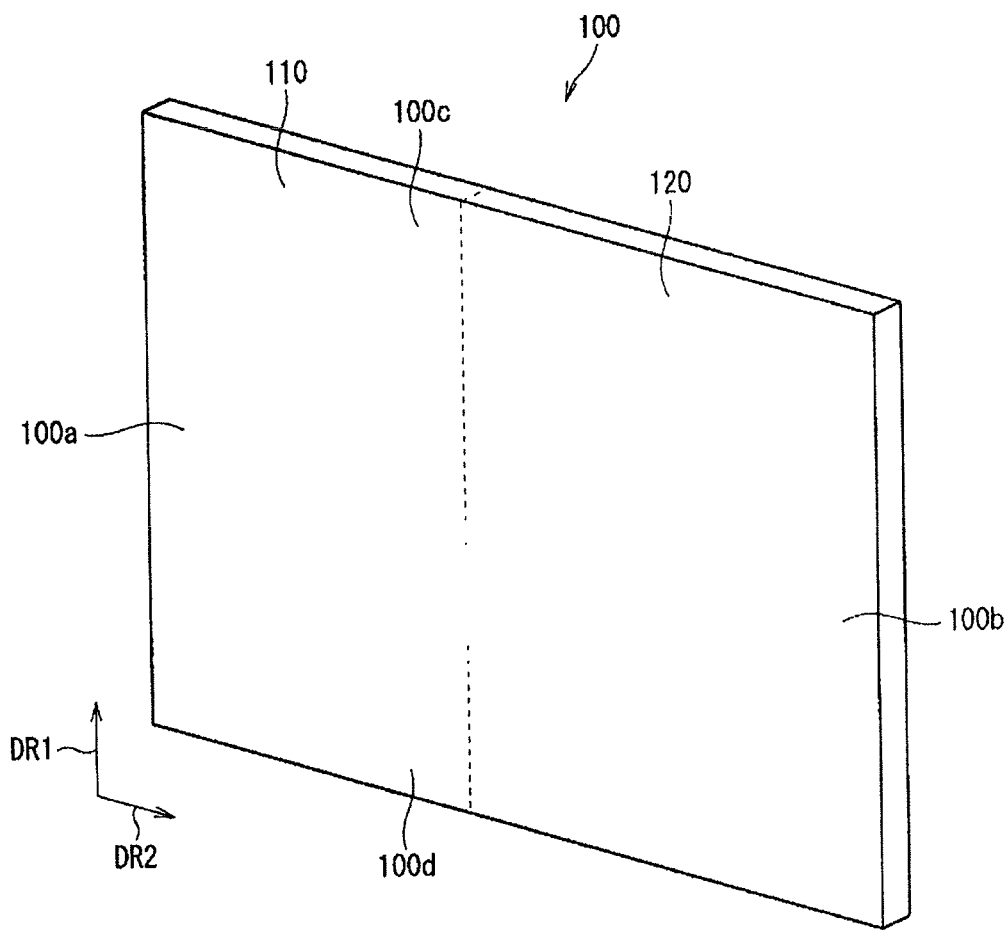
FIG. 6 is a perspective view showing a nonwoven material.

Next, a method for producing the cover member 3 shown in FIG. 5 is explained. FIG. 6 is a view showing an example of a nonwoven material 100 as a material for the cover member 3. The nonwoven material 100 shown in FIG. 6 is a rectangular sheet-like member. The nonwoven material 100 may have a shape other than such a rectangular shape.

The nonwoven material 100 has a first edge portion 100*a* and a second edge portion 100*b* extending along a first direction DR1 that is perpendicular to the thickness direction of the nonwoven material 100, and a third edge portion 100*c* and a fourth edge portion 100*d* extending along a second direction DR2 that is perpendicular to the thickness direction and the first direction DR1.

In the nonwoven material 100, the aforementioned hard portion 30 is composed of a rectangular first portion 110 that includes the first edge portion 100*a*, about two fifths of the third edge portion 100*c* on the first edge portion 100*a* side, and about two fifths of the fourth edge portion 100*d* on the first edge portion 100*a* side. Further, in the nonwoven material 100, the aforementioned soft portion 31 is composed of the portion other than the first portion 110, that is, a rectangular second portion 120 that includes the second edge portion 100*b*, about three fifths of the third edge portion 100*c* on the second edge portion 100*b* side, and about three fifths of the fourth edge portion 100*d* on the second edge portion 100*b* side. The dashed line shown in FIG. 6 indicates the boundary between the first portion 110 and the second portion 120.

The first portion 110 and the second portion 120 are adjacent to each other in the second direction DR2, and one edge of the first portion 110 in the second direction DR2 and one edge of the second portion 120 in the second direction DR are continuous with each other. In the nonwoven material 100, the first edge portion 100*a* included in the first portion 110 serves as the edge portion 300 of the hard portion 30 that is overlapped with the soft portion 31, and the second edge portion 100*b* included in the second portion 120 serves as the edge portion 310 of the soft portion 31 that is overlapped with the hard portion 30.

Figure 7:
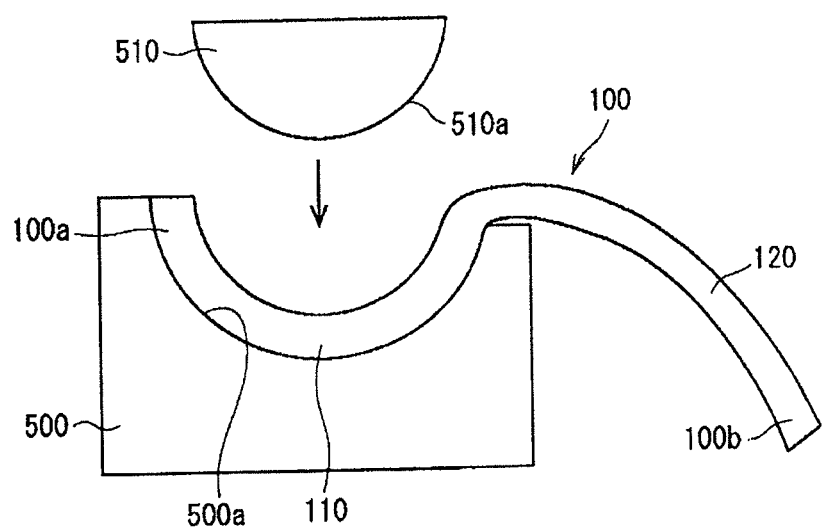
FIG. 7 is a view showing a lower die and an upper die used when hot pressing the nonwoven material.

In the nonwoven material 100, only the first portion 110 is hot pressed, and the second portion 120 is not hot pressed. FIG. 7 is a view showing a lower die 500 and an upper die 510 used when hot pressing the first portion 110. As shown in FIG. 7, the lower die 500 is provided to have a concave curved surface 500*a* on its upper surface. The lower surface of the upper die 510 is formed into a convex curved surface 510*a* that has a shape corresponding to the shape of the concave curved surface 500*a* of the lower die 500.

Figure 8:
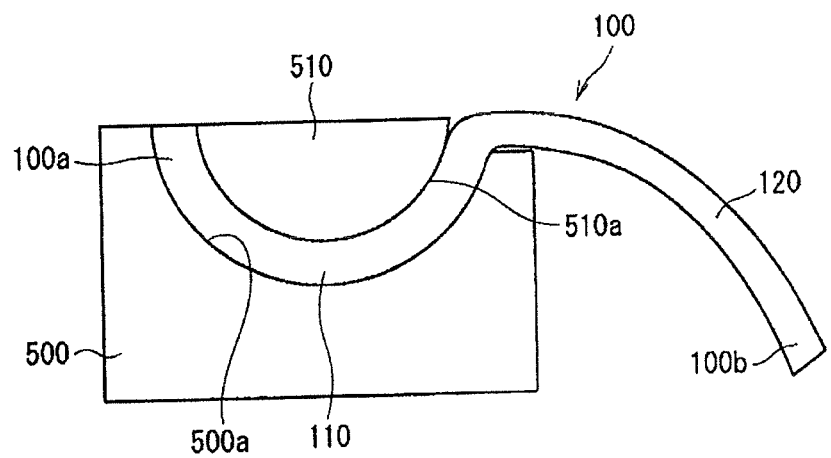
FIG. 8 is a view showing a first portion of the nonwoven material when it is sandwiched between the lower die and the upper die.

When the nonwoven material 100 is hot pressed, the first portion 110 is disposed on the concave curved surface 500*a* of the lower die 500 so that both edge portions of the first portion 110 in the first direction DR1 are bent, as shown in FIG. 7. Then, as shown in FIG. 8, the first portion 110 is sandwiched between the concave curved surface 500*a* of the lower die 500 and the convex curved surface 510*a* of the upper die 510. Thereafter, in the state where the lower die 500 and the upper die 510 are heated by a heater, which is not shown, a pressure is applied to the lower die 500 and the upper die 510. Thus, the first portion 110 of the nonwoven material 100 is hot pressed (heated and pressurized) so as to be bent from one edge to the other in the second direction DR2, and the first portion 110 is cured in a bent state.

By hot pressing the first portion 110 of the nonwoven material 100 as described above, the cover member 3 shown in FIG. 5 is accomplished. Thereafter, the wire bundle 2 is disposed on the concave surface of the hot-pressed first portion 110 (the hard portion 30) (see FIGS. 3 and 4), and the first portion 110 and the second portion 120 (the soft portion 31) are partially overlapped with each other so that the wire bundle 2 is covered by the first portion 110 and the second portion 120. Thus, the wire harness 1 shown in FIGS. 1 and 2 is accomplished.

Figure 9:
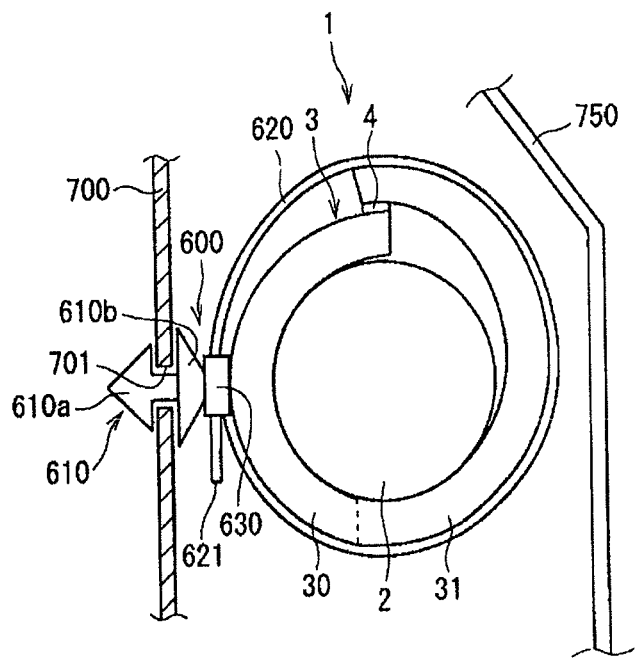
FIG. 9 is a view showing the wire harness when it is fixed to an attachment object by a fixing member.

When the wire harness 1 is arranged in a vehicle, it is fixed to an attachment object such as a vehicle frame by a fixing member such as a band clip. FIG. 9 is a view showing the wire harness 1 when it is fixed to an attachment object 700 by a fixing member 600. The attachment object 700, for example, is a vehicle frame.

The fixing member 600 for fixing the wire harness 1 to the attachment object 700 is attached to the cover member 3 of the wire harness 1. The fixing member 600 is, for example, a band clip, and includes a fixed part 610 that is fixed to the attachment object 700, a band part 620 that is wound around the cover member 3 of the wire harness 1, and a band engaging part 630 that engages the band part 620.

The band part 620 extends from the band engaging part 630 and has a tip 621 that is a free end. The band engaging part 630 is engaged with the band part 620 wound around the cover member 3 and maintains the engaged state. The band engaging part 630 has an insertion hole through which the band part 620 is inserted, and an engaging piece, provided in the insertion hole, which engages one of a plurality of engaging grooves provided on the surface of the band part 620. When the band part 620 is inserted through the insertion hole of the band engaging part 630 from the tip 621, the engaging piece inside the insertion hole engages one of the plurality of engaging grooves on the surface of the band part 620, so that the band part 620 shall not dislodge from the insertion hole.

The fixed part 610 is connected to the band engaging part 630, and is engaged so as not to dislodge from an attaching hole 701 provided in the attachment object 700. FIG. 9 shows a cross-sectional structure of the attachment object 700 around the attaching hole 701.

The fixed part 610 includes an engaging head 610a that is inserted through the attaching hole 701 of the attachment object 700, and a plate-shaped portion 610b. In the fixed part 610, when the engaging head 610a is inserted through the attaching hole 701, a portion of the attachment object 700 that surrounds the attaching hole 701 is sandwiched between the engaging head 610a and the plate-shaped portion 610b. Thus, the fixed part 610 is fixed to the attachment object 700.

When the fixing member 600 is attached to the cover member 3 of the wire harness 1 (the hot-pressed nonwoven material 100), the fixed part 610 of the fixing member 600 is located on the hard portion 30 (the hot-pressed first portion 110 of the nonwoven material 100) of the cover member 3, as shown in FIG. 9. This allows the cover member 3 to be fixed to the attachment object 700 in the hard portion 30. As a result, when the wire harness 1 is fixed to the attachment object 700, the soft portion 31 of the cover member 3 can be oriented toward an interfering material 750 that is present in the surroundings of the wire harness 1, such as an instrument panel, a decorative board, or the like. That is, the wire harness 1 can be fixed to the attachment object 700 so that the soft portion 31 of the cover member 3 is oriented toward the interfering material 750 in the surroundings. Accordingly, the interfering material 750 is made more likely to come into contact with the soft portion 31 of the cover member 3, and thus generation of abnormal noises can be suppressed due to the interfering material 750 coming into contact with the cover member 3.

In this way, this embodiment has a configuration in which the wire bundle 2 is covered by a member having the hard portion 30 (the hot-pressed first portion 110 of the nonwoven material 100) and the soft portion 31 (the second portion 120 of the nonwoven material 100), thereby making it possible to restrict the routing of the wire bundle 2 by the hard portion 30, while suppressing generation of abnormal noises by the soft portion 31.

Further, this embodiment has a configuration in which the hard portion 30 and the soft portion 31 are partially overlapped with each other so that the wire bundle 2 is covered by the hard portion 30 and the soft portion 31, thereby making it possible to cover a plurality of types of wire bundles 2 having a different diameter using the same member by adjusting the overlapping margin (wrapping margin) of the hard portion 30 and the soft portion 31.

Figure 10:
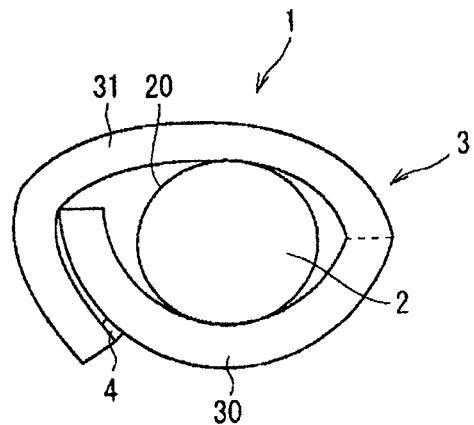
FIG. 10 is a view showing a wire bundle having a small diameter when it is covered by the cover member.

FIG. 10 is a view showing the wire harness 1 according to this embodiment in which a wire bundle 2 having a diameter that is smaller than that of the wire bundle 2 shown in FIGS. 1 and 2 is covered by the cover member 3 (the hot-pressed nonwoven material 100). As shown in FIG. 10, when the wire bundle 2 having a small diameter is covered by the cover member 3, the overlapping margin of the hard portion 30 and the soft portion 31 is increased. On the other hand, when the wire bundle 2 having a larger diameter is covered by the cover member 3, as shown above in FIG. 2, the overlapping margin of the hard portion 30 and the soft portion 31 is reduced. In this way, it is made possible to cover a plurality of types of wire bundles 2 having a different diameter using the same member. Accordingly, there is no need to change the shape of the cover member 3 for every diameter size of the wire bundles 2, thereby eliminating the need to newly form dies (dies used for hot pressing the nonwoven material 100), which are used when producing the cover member 3, for every diameter size of the wire bundles 2. As a result, production cost of the wire harness 1 can be reduced.

Further, by disposing the wire bundle 2 on the concave surface 30a of the bent hard portion 30 (the first portion 110 that has been hot pressed so as to be bent) (see FIGS. 3 and 4) when the wire bundle 2 is covered by the cover member 3 (the hot-pressed nonwoven material 100), as in this embodiment, the wire bundle 2 is made difficult to move when covering the wire bundle 2 by the cover member 3, as compared to the case where the wire bundle 2 is disposed on a flat surface of the hard portion 30 without bending the hard portion 30. Accordingly, it is made easy to cover the wire bundle 2 by the cover member 3. As a result, the workability is improved.

Figure 11:
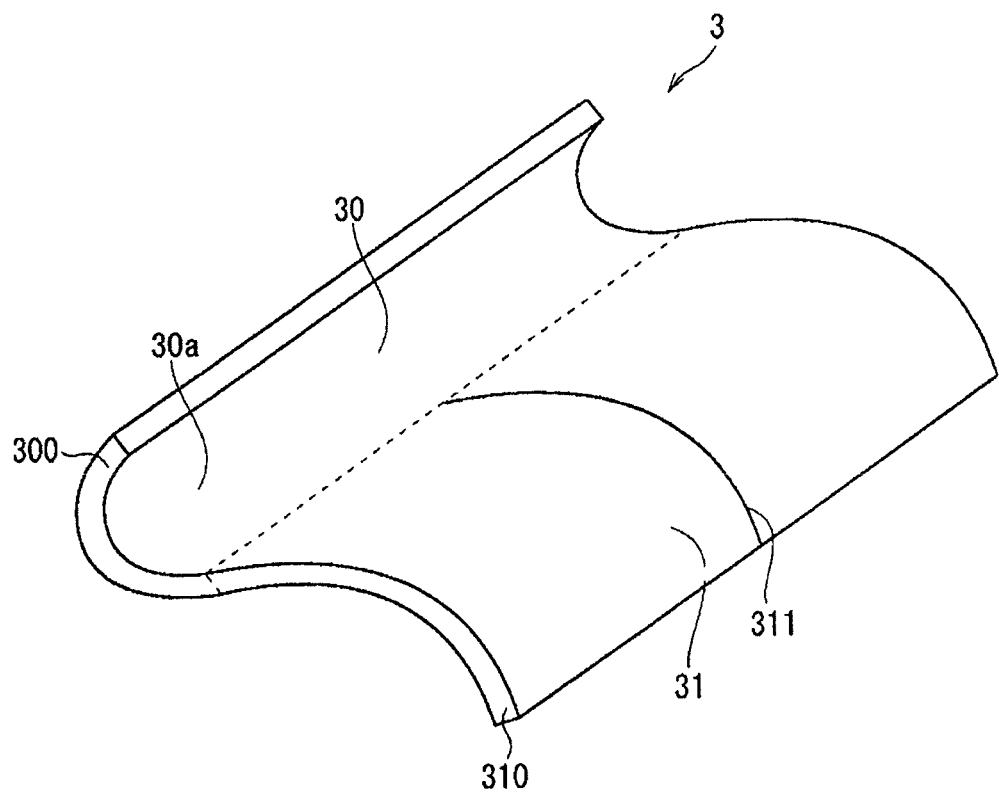
FIG. 11 is a view showing a second portion of the cover member in which a slit is provided.

It is possible to attach the cover member 3 covering the wire bundle 2 to a branched portion of the wire bundle 2, by forming a slit 311 in the soft portion 31 of the cover member 3, as shown in FIG. 11. In the example of FIG. 11, the slit 311 is formed from one edge of the soft portion 31 on the opposite side of the edge that is continuous with the hard portion 30 to the edge on the hard portion 30 side. Accordingly, the soft portion 31 is divided into two at the point where the slit 311 is formed.

Figure 12:
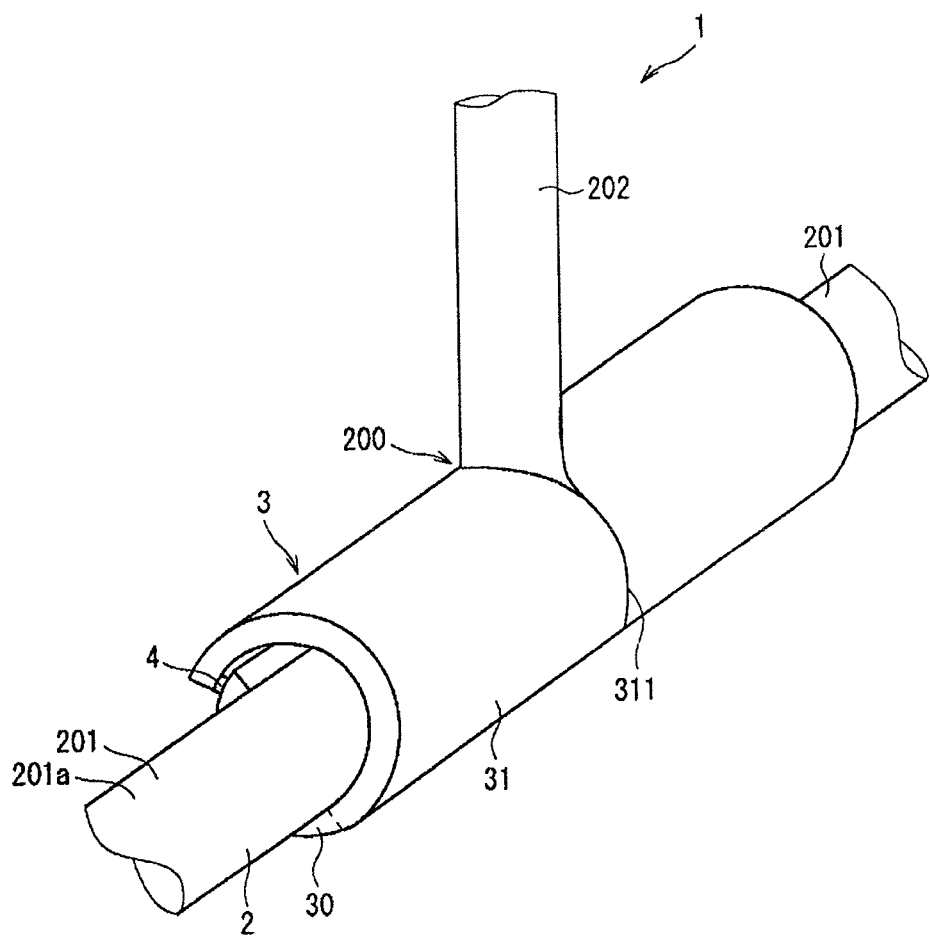
FIG. 12 is a view showing the cover member when it is attached to a branched portion of a wire bundle.

FIG. 12 is a view showing the cover member 3 shown in FIG. 11 when it is attached to a branched portion 200 of the wire bundle 2. A branch line 202 is branched from a main line 201 at the branched portion 200 of the wire bundle 2. When the cover member 3 is attached to the branched portion 200 of the wire bundle 2, the hard portion 30 and the soft portion 31 are partially overlapped with each other so that the branch line 202 is exposed through the slit 311 of the soft portion 31, and an outer circumferential surface 201a of the main line 201 is covered by the hard portion 30 and the soft portion 31.

In this way, the slit 311 is formed in the soft portion 31, thereby making it possible to easily attach the cover member 3 to the branched portion 200 of the wire bundle 2.

It should be noted that the slit 311 may be provided, before the first portion 110 of the nonwoven material 100 is hot pressed, in the second portion 120 of the nonwoven material 100 that serves as the soft portion 31, or may be provided, after the first portion 110 of the nonwoven material 100 is hot pressed, in the second portion 120 that is not hot pressed, that is, the soft portion 31 of the cover member 3.

Further, the length of the slit 311 from the edge of the soft portion 31 on the opposite side of the edge that is continuous with the hard portion 30 may be determined depending on the diameter of the branch line 202. That is, when the branch line 202 has a large diameter, the length of the slit 311 may be shortened, and when the branch line 202 has a small diameter, the length of the slit 311 may be shortened.

This invention has been described above in detail, which are intended to be illustrative in all aspects, rather than restrictive. It is understood that various modifications which have not been mentioned above can be made without departing from the scope of the invention.

LIST OF REFERENCE NUMERALS

1: Wire Harness
2: Wire Bundle
3: Cover Member
30, 110: First Portion
30a: Concave Surface 31, 120: Second Portion
200: Branched Portion
201: Main Line
202: Branch Line
311: Slit
600: Fixing Member
610: Fixed Part
700: Attachment Object

The invention claimed is:

1. A method for producing a wire harness, comprising:
hot pressing a first portion including an edge portion of a nonwoven material and curing the first portion of the nonwoven material; and
thereafter partially overlapping the first portion with a second portion that is softer than the first portion and is a portion of the nonwoven material other than the first portion, so that a wire bundle is covered by the first portion and the second portion.

2. The method for producing a wire harness according to claim 1, wherein:
during the hot pressing the first portion is hot pressed so that the first portion is bent, and
the partially overlapping comprises:
disposing the wire bundle on a concave surface of the first portion; and
thereafter partially overlapping the first portion and the second portion with each other so that the wire bundle on the first portion is covered by the second portion.

3. The method for producing a wire harness according to claim 1, further comprising:
after the partially overlapping attaching a fixing member for fixing the wire harness to an attachment object to the nonwoven material covering the wire bundle, wherein
the fixing member is attached to the nonwoven material so that a fixed part of the fixing member which is fixed to the attachment object is located on the first portion.

4. The method for producing a wire harness according to claim 1, further comprising:
before the partially overlapping forming a slit in the second portion, wherein
during the partially overlapping the first portion and the second portion are partially overlapped with each other so that, at a branched portion of the wire bundle where a branch line is branched from a main line, the branch line is exposed through the slit of the second portion, and the main line is covered by the first portion and the second portion.

5. A wire harness comprising:
a wire bundle; and
a cover member which is composed of a hot-pressed nonwoven material and covers the wire bundle, wherein
the cover member comprises:
a first portion of the nonwoven material that includes an edge portion of the nonwoven material and that is hot pressed and cured; and
a second portion of the nonwoven material that is softer than the first portion, and
the first portion and the second portion of the cover member are partially overlapped with each other so that the wire bundle is covered by the first portion and the second portion.

6. The wire harness according to claim 5, wherein
the first portion is bent so as to be concave on the wire bundle side.

7. The wire harness according to claim 5, further comprising:
a fixing member attached to the cover member, for fixing the wire harness to an attachment object, wherein
the fixing member has a fixed part, which is fixed to the attachment object, located on the first portion.

8. The wire harness according to claim 5, further comprising:
a slit provided in the second portion, wherein
the first portion and the second portion are partially overlapped with each other so that, at a branched portion of the wire bundle where a branch line is branched from a main line, the branch line is exposed through the slit of the second portion, and the main line is covered by the first portion and the second portion.

* * * * *